United States Patent Office 3,363,160
Patented Jan. 9, 1968

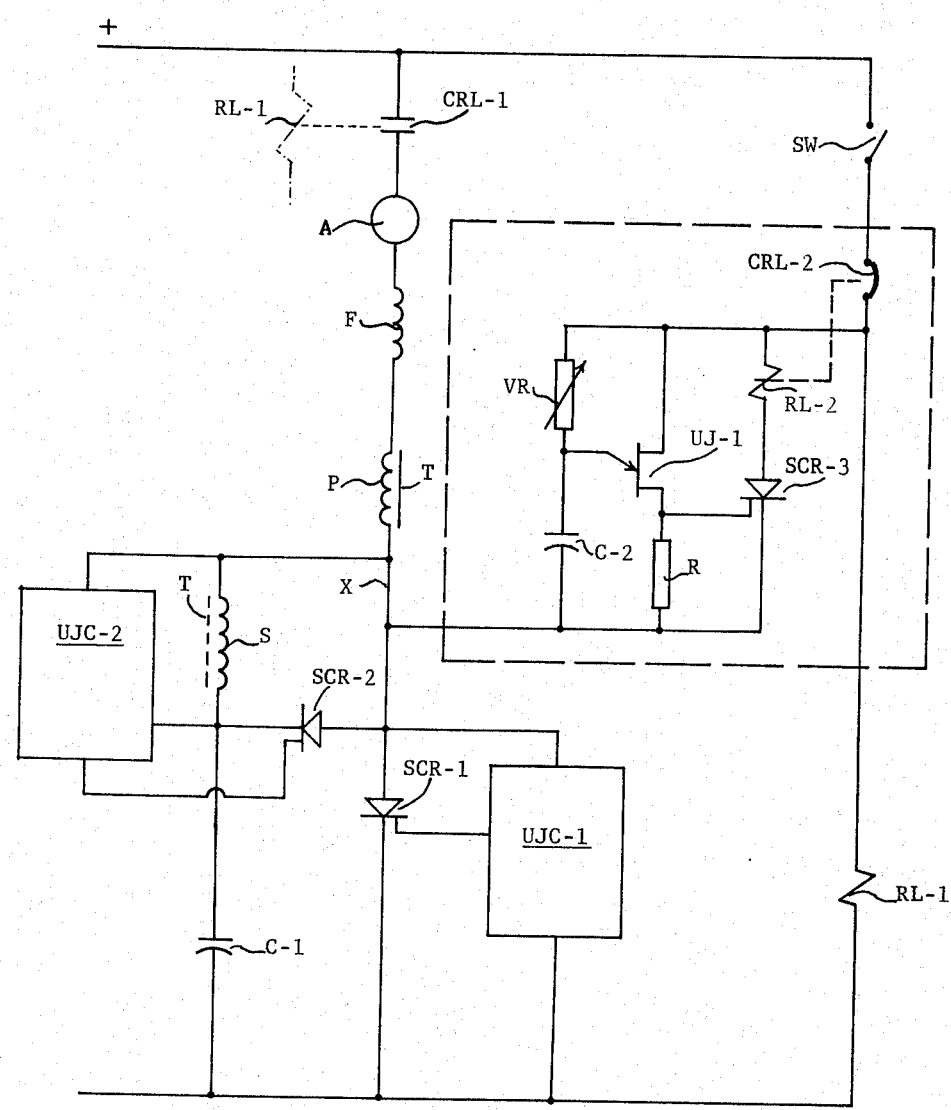

3,363,160
MOTOR CONTROL FAIL SAFE CIRCUITRY
Herbert E. Morris, Roanoke, Va., assignor to General
Electric Company, a corporation of New York
Filed Nov. 5, 1965, Ser. No. 506,512
4 Claims. (Cl. 318—341)

This invention relates to control circuits for direct current motors wherein solid state devices are used to regulate the main source of electrical power supply, particularly in respect to solid state devices known as controlled silicon rectifiers. Circuits of this type, where the average power from a potential source supplied to a direct current motor is selectively varied, are frequently used upon battery operated trucks used in warehouses and the like for transporting materials and supplies. When a malfunction occurs in circuits of this type it may result in the application of the full operating potential to the motor by the continued conductive state of the controlled silicon rectifier and consequent damage to the equipment or injury to operating personnel.

A motor control circuit such as shown in United States Patent 3,150,307 is typical of the apparatus that may become involved. In circuits of this type, for example, a first controlled silicon rectifier is connected in series with the armature of a motor and is made conductive by a so-called "firing circuit" whereby controlled pulses of power are provided to the armature. A commutating capacitor is connected across the first controlled silicon rectifier and is discharged by a second controlled silicon rectifier at a predetermined time after the first controlled silicon rectifier is made conductive, thereby commutating the first controlled silicon rectifier. A second firing circuit is used to control the second controlled silicon rectifier, the circuit being connected in the conducting path of the first controlled silicon rectifier so that it is operative only when the first controlled silicon rectifier is conducting. Similarly, the first controlled silicon rectifier has its firing circuit connected in parallel therewith to insure that the firing circuit can not operate when its controlled silicon rectifier is conducting.

In spite of these precautions, however, further insurance against damage to equipment and injury to operating personnel is desirable.

It is an object, therefore, of this invention to provide a circuit to effectually remove the motor from its energizing power supply in the event that conditions prevail where control of the motor may be lost with the full power supply applied directly to the armature.

The invention is set forth with particularity in the appended claims. The principles and characteristics of the invention, as well as other objects and advantages are revealed and discussed through the medium of the illustrative embodiments appearing in the specification and drawings which follow.

Referring now to the drawing a motor having an armature A and a field F is connected from the positive side of the direct current supply line, as indicated by the (+) and (−) lines, through a normally open contact CRL–1, to the primary winding P of a transformer T, to line X, to the anode of a controlled silicon rectifier SCR–1, the cathode of which is connected to the negative side of the direct current supply line. The anode of another controlled silicon rectifier SCR–2 is connected to line X, its cathode being connected to the negative side of the direct current supply line through a capacitor C–1. Each of these controlled silicon rectifiers SCR–1 and SCR–2 is gated via a conventional uni-junction transistor oscillator trigger circuit similar to that shown, for example, in FIGURE 4.18, page 56, of the General Electric Campany's Silicon Controlled Rectifier Manual, third edition, copyright 1964, SCR–1 by a circuit UJC–1 and SCR–2 by a circuit UJC–2. Normally under operating conditions the controlled silicon rectifier SCR–1 is alternately turned "on" and "off," respectively, by its gating circuit and by controlled silicon rectifier SCR–2 under control of its gating circuit and the secondary S of transformer T so that the voltage upon line X alternates between positive line voltage and negative line voltage when the switch SW is closed, the contacts CRL–2 normally being closed manually, whereby a relay winding RL–1 closes the normally open contacts CRL–1.

An oscillator comprised of a uni-junction transistor UJ–1, a resistor R, a capacitor C–2 and a variable resistor VR is connected to line X, together with a controlled silicon rectifier SCR–3, the latter having its anode connected to the positive line voltage through a relay winding RL–2 and the oscillator circuit being connected to the positive line voltage also. Both of these positive line voltage connections are through contacts CRL–2 and the switch SW. The rate of oscillation of the oscillator is regulated via variable resistor VR, and this rate is set so that the period of a single oscillation is greater than the cycle of potential reversal upon line X; i.e., the time that line X remains negative. Since the oscillator will not function unless line X is negative under these conritions the controlled silicon rectifier SCR–3 will not conduct in view of the fact that line X becomes positive when the controlled silicon rectifier SCR–1 is "off."

In the event, however, that a malfunction occurs whereby controlled silicon rectifier SCR–1 remains "on," the oscillator having been set by resistor VR will cause controlled silicon rectifier SCR–3 to conduct thereby causing relay RL–2 to be energized opening contacts CRL–2, which in turn de-energizes relay winding RL–1 and results in the opening of contacts CRL–1. The motor armature A therefore becomes disconnected from the power supply and the positive line voltage becomes isolated from all operating circuits. It is to be noted that the contacts CRL–2, which open under control of the relay winding RL–2, are required to be manually reset before the motor can be put into operation again.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A control circuit for a direct current motor including a pair of controlled silicon rectifiers, the first of said rectifiers providing intermittently a source of E.M.F. to the armature of said motor and the second of said rectifiers rendering intermittently the first said rectifier non-conductive, means to excite each of the said rectifiers to conduct at predetermined rates, an oscillator having a common connection with said rectifiers, said oscillator having a period of oscillation overlapping the period of conduction of the first said rectifier, and means controlled by said oscillator for removing the said source of E.M.F. from said motor armature when the period of conduction of the first said rectifier is prolonged.

2. The invention of claim 1 with the further modification of a third controlled silicon rectifier arranged when conducting to disconnect said motor armature from said source of E.M.F. and means under control of said oscillator for causing said rectifier to conduct when the period of conduction of the first said rectifier is prolonged.

3. The invention of claim 1 with the further modification of a third controlled silicon rectifier arranged when conducting to disconnect said motor armature from said source of E.M.F. and means under control of said oscillator for causing said rectifier to conduct when the period of conduction of the first said rectifier exceeds the period of said oscillator.

4. The invention of claim 1 with the further provision of means controlled by said oscillator for removing said source of E.M.F. from said motor armature when the period of conduction of the first said rectifier exceeds the period of said oscillator.

References Cited

UNITED STATES PATENTS 3,214,640  10/1965  Mills _____ 317—50 X

ORIS L. RADER, *Primary Examiner.*

J. J. BAKER, *Assistant Examiner.*